United States Patent [19]

Hickey

[11] 4,103,810

[45] Aug. 1, 1978

[54] PACKAGING OF GOODS ON A VEHICLE

[76] Inventor: Christopher Daniel Dowling Hickey, 5, Heathside, Hinchley Wood, Esher, Surrey, England

[21] Appl. No.: 714,285

[22] Filed: Aug. 13, 1976

[30] Foreign Application Priority Data

Sep. 18, 1975 [GB] United Kingdom ............... 34286/75

[51] Int. Cl.² .............................................. B60R 9/00
[52] U.S. Cl. .................................. 224/29 R; 150/0.5; 206/497; 206/522; 224/42.1 E
[58] Field of Search ...................... 224/42.1 R, 42.1 E, 224/29 R, 42.1 B; 296/37.7; 206/386, 497, 522; 150/0.5

[56] References Cited

U.S. PATENT DOCUMENTS

| 2,914,231 | 11/1959 | Hornke | 224/42.1 E |
| 2,920,802 | 1/1960 | Cook | 224/42.1 E |
| 3,000,418 | 9/1961 | Bitting | 224/42.1 E X |
| 3,263,881 | 8/1966 | Wooten | 224/42.1 E |
| 3,850,214 | 11/1974 | Hickey | 206/386 |

FOREIGN PATENT DOCUMENTS 1,191,921 5/1960 United Kingdom.

*Primary Examiner*—Trygve M. Blix
*Assistant Examiner*—Winston H. Douglas
*Attorney, Agent, or Firm*—Young & Thompson

[57] ABSTRACT

A container for goods in a vehicle comprises a lower rigid part of impermeable material and a flexible impermeable cover, the cover being sealable within a channel on the lower part by means of an inflatable tube so as to form an airtight structure which can be partially evacuated so that the cover is held tightly down onto goods in the container. The channel is formed in the upper edge of a rigid wall which extends around at least the front end of the container to provide restraint against forward movement of goods in the container.

2 Claims, 3 Drawing Figures

U.S. Patent  Aug. 1, 1978  4,103,810
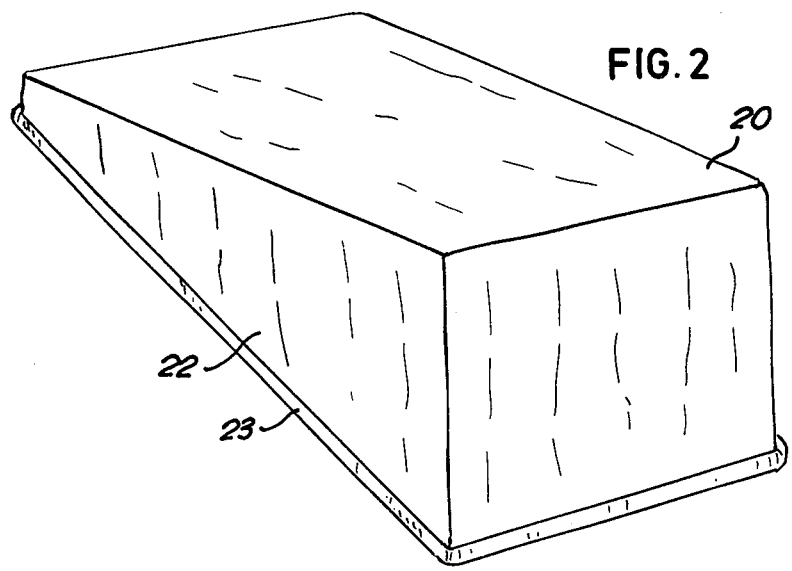
FIG. 2
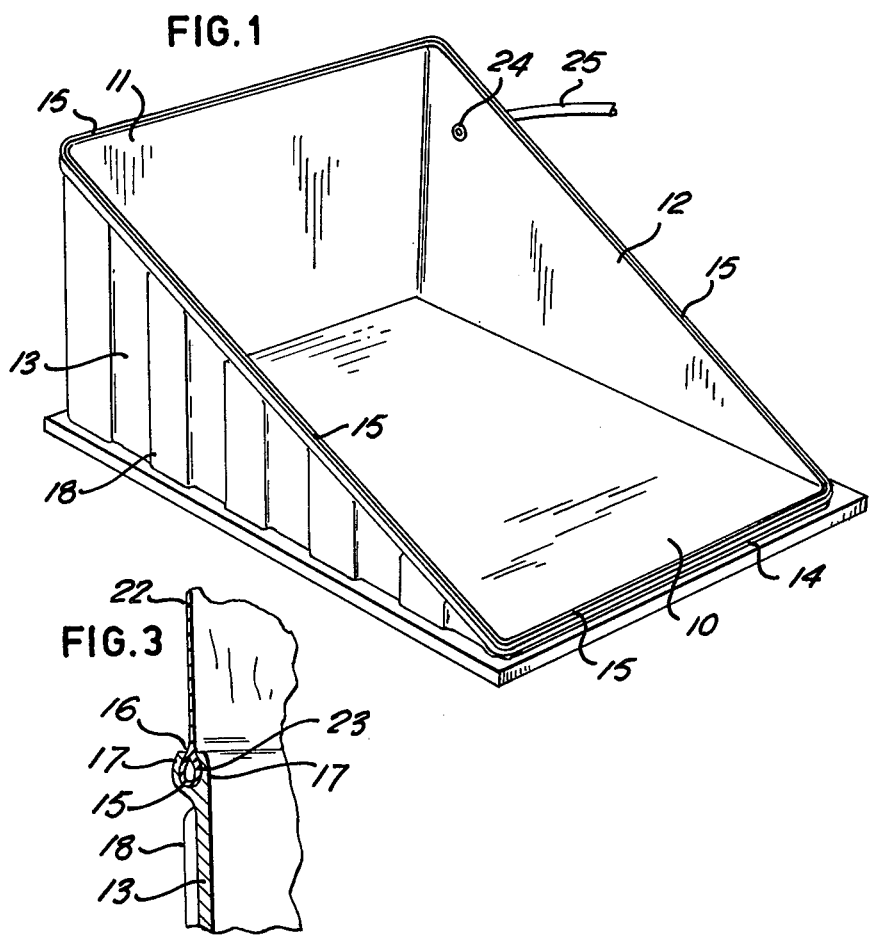
FIG. 1
FIG. 3

PACKAGING OF GOODS ON A VEHICLE

BACKGROUND OF THE INVENTION

1. Field of the Invention

This invention relates to the packaging of goods on a vehicle.

2. Description of the Prior Art

Particularly in aircraft it is necessary that goods stowed for transport should be firmly secured so that they cannot shift. It is a particular requirement in aircraft that adequate restraint be given against possible movement in the forward direction, i.e. the direction of travel of the aircraft. It may be necessary to resist accelerations and more particularly, decelerations of perhaps 4G or possibly up to 13G. On lorries and other road vehicles the conditions may be less onerous but again there are often circumstances in which goods should be secured so that they are held in position on the vehicle and firmly constrained against possible forward motion.

It is known to package goods for transport on a pallet or other rigid impermeable base and to secure them on the pallet by means of a flexible impermeable envelope which is partially evacuated so as to hold the envelope firmly down onto the goods. See for example British Pat. No. 1,191,921 and U.S. Pat. No. 3,000,418. The envelope may be sealed to the base by an inflatable tube on the envelope and positioned in a channel in the base as described in U.S. Pat. No. 3,850,214. The flexible envelope in such prior constructions may not be capable of withstanding severe longitudinal forces, for example due to a sudden deceleration of the vehicle, and it is one of the objects of the present invention to provide an improved form of container which retains the advantages of vacuum restraint using a flexible envelope but giving further restraint against forces due to deceleration of the vehicle.

SUMMARY OF THE INVENTION

According to the present invention, there is provided a container in a vehicle, said container comprising a lower portion integral with or secured to or adapted to be secured to the structure of the vehicle and having an upright end wall forming or adapted to form the forward end of the container which end wall is joined to two adjacent side walls and a base, the walls and base being formed as a rigid impermeable structure, an impermeable flexible envelope forming a cover having a lower periphery adapted to fit into a continuous channel on said lower portion, and an inflatable tubular seal for effecting an airtight seal in said channel between the envelope and said lower portion. The inflatable seal may comprise an inflatable tube attached to or integral with the lower periphery of the envelope and adapted to fit in the channel or it may comprise a separate tube fitting in or secured in the channel.

The channel is most conveniently formed in the side and end walls of the lower portion. It is convenient therefore to form the lower portion with both front and rear end walls. The front wall is preferably of sufficient height to form an adequate forward restraint for goods, e.g. at least half the height of the container. The rear end wall may be made of lower height than the forward end wall to facilitate loading of the container. The division between the top and bottom portions is preferably along a flat plane sloping downwardly from front to rear.

The lower portion may be integral with or secured in the vehicle, or it may be adapted to be secured in the vehicle or it may be adapted for securing to standard pallets such as are used in aircraft, suitable mechanical locks being provided, if this lower portion is movable, to lock the lower portion in position so that it can be firmly secured to the vehicle with the end wall at the forward end. The goods are stowed in the lower portion and the cover can then be put over this lower portion, sealed in position by the aforementioned inflatable seal. Provision may be made for extracting air from inside the container so that the flexible cover is drawn down onto the goods to hold them firmly in position. For this purpose, a duct with a one-way valve may be provided through said lower portion. An air extraction pump may be provided on the vehicle connectable to this duct.

The invention furthermore includes within its scope a vehicle having a container mounted thereon, which container comprises a lower portion having a substantially rectangular base of rigid impermeable material secured to the vehicle, upright front, rear and side walls of rigid impermeable material extending upwardly from the periphery of the base to form a continuous enclosure, the front wall having a uniform height which is greater than the uniform height of the rear wall and the side walls each having a height at the front end equal to that of the front wall and, at the rear end equal to that of the rear wall, the side walls sloping uniformly from front to rear, said walls having a groove in their top edges forming a continuous channel around the upper edge of said lower portion, said container further comprising an impermeable flexible envelope having an opening with a periphery of length equal to the length of said channel and adapted to fit in said channel, an inflatable tubular seal extending along the length of the periphery of said opening for effecting an airtight seal between the envelope and said lower portion, and one-way valve means in an air extraction duct through said lower portion to permit of extraction of air from within said container.

BRIEF DESCRIPTION OF THE DRAWING

FIG. 1 is an isometric view illustrating the lower portion of a container;

FIG. 2 is an isometric view showing the upper portion of a container; and

FIG. 3 is a section through a seal between the upper and lower portions of the container.

DESCRIPTION OF THE PREFERRED EMBODIMENT

Referring to FIG. 1 there is shown a rigid structure, conveniently formed of metal comprising an air-impermeable base 10, a forward end wall 11 extending uprightly from one end of the base and two side walls 12, 13. The side walls are air-impermeable. Along the rear end of the base there is a low rear wall 14. The walls may have strengthening ribs 18. The top edges of the four walls 11, 12, 13 and 14 are formed with a channel or groove 15 which thus extends continuously around the upper periphery of the base portion to accept a top cover. The side walls slope uniformly from the front end where they are of the height of the front wall to the rear end where they are of the height of the rear wall. In other words, the top edges of the walls lie in a flat plane sloping from front to rear. As seen in FIG. 3, this channel 15 has a mouth 16 with divergent side walls 17 so that the lower part of the channel is wider than the mouth.

FIG. 2 shows an impermeable flexible top cover of sheet material, e.g. butyl rubber, shaped to form an envelope having a top portion 20, an end wall 21 and two side walls 22. The cover has a shallow front end wall not seen in the drawing. The opening in the envelope, which opening is defined by the lower edges of the four walls, is of the same height as the channel 15 and the envelope is shaped so that the periphery of the opening can be fitted into this channel. An inflatable tubular seal 23 is provided around the lower edge of the two end walls and the two side walls so that it extends completely around the periphery. This inflatable seal may be formed of a tube secured to the sheet forming the cover or it may be formed integrally therewith. Alternatively, the seal 23 may be a separate tube located within the channel 15.

In use, after the lower portion of the container has been filled or partially filled with goods, the top cover is put in position with the inflatable seal 23 tucked into the channel 15 around the periphery of the lower portion of the container. The tube of the seal 23 is then inflated so as to form an airtight seal. The shaping of the channel 15 with the narrow mouth and divergent side walls ensures that the tubular seal, when inflated, is firmly held in the channel. Air is then extracted from the container through a duct 25 which may include a one-way air extraction valve 24 (FIG. 1) so collapsing the top cover down onto the goods and ensuring that they are held securely in position. The rigid front end wall 11 on the bottom portion provides the full strength required to resist any forward motion. The collapsed top cover is held downwardly by suction and prevents motion of the goods in other directions.

The front end wall 11 is made higher than the rear wall in order to ensure that it provides adequate support against forward movement. Preferably it is made to extend upwardly for at least half the height of the container.

I claim:

1. A vehicle having a container mounted thereon, which container comprises a lower portion having a substantially rectangular base of rigid impermeable material secured to the vehicle, upright front, rear and side walls of rigid impermeable material extending upwardly from the periphery of the base to form a continuous enclosure, the front wall having a uniform height which is greater than the uniform height of the rear wall and the side walls each having a height at the front end equal to that of the front wall and, at the rear end equal to that of the rear wall, the side walls sloping uniformly downwardly along a flat plane from front to rear, said walls having a groove in their top edges forming a continuous channel around the upper edge of said lower portion, said container further comprising an impermeable flexible envelope having an opening with a periphery of length equal to the length of said channel and adapted to fit in said channel, an inflatable tubular seal on the periphery of the opening in said envelope and extending along the length of the periphery of said opening for effecting an airtight seal between the envelope and said lower portion, and one-way valve means in an air extraction duct through said lower portion to permit of extraction of air from within said container.

2. A vehicle as claimed in claim 1 wherein said channel has a mouth with side walls diverging from the mouth.

* * * * *